(12) United States Patent
Kesti et al.

(10) Patent No.: US 7,879,140 B2
(45) Date of Patent: Feb. 1, 2011

(54) METHOD AND APPARATUS FOR DEGASSING COATING MATERIAL

(75) Inventors: Eero Kesti, Raisio (FI); Esa Forsten, Naantali (FI)

(73) Assignee: Metso Paper, Inc., Helsinki (FI)

( * ) Notice: Subject to any disclaimer, the term of this patent is extended or adjusted under 35 U.S.C. 154(b) by 262 days.

(21) Appl. No.: 12/159,064

(22) PCT Filed: Nov. 9, 2006

(86) PCT No.: PCT/FI2006/050486

§ 371 (c)(1),
(2), (4) Date: Sep. 10, 2008

(87) PCT Pub. No.: WO2007/074211

PCT Pub. Date: Jul. 5, 2007

(65) Prior Publication Data

US 2009/0301303 A1    Dec. 10, 2009

(30) Foreign Application Priority Data

Dec. 28, 2005    (FI) .................................. 20055704

(51) Int. Cl.
*B01D 19/00* (2006.01)
(52) U.S. Cl. ............................ 95/248; 95/261; 95/266; 96/196; 96/214; 96/215; 96/216; 159/5; 159/6.1; 159/6.2
(58) Field of Classification Search ................... 95/241, 95/242, 243, 247, 261, 262, 266, 260, 267, 95/269, 270; 96/155, 161, 167, 174, 176, 96/177, 178, 179, 180, 183, 187, 193, 194, 96/195, 196, 206, 209, 210, 214, 215, 216, 96/204, 208; 55/406, 407; 210/512.1, 787; 159/5, 6.1, 6.2, 6.3
See application file for complete search history.

(56) References Cited

U.S. PATENT DOCUMENTS

| 3,213,592 | A |   | 10/1965 | Rich |   |
|---|---|---|---|---|---|
| 3,856,483 | A |   | 12/1974 | Rumpf et al. |   |
| 4,153,500 | A | * | 5/1979 | Feres | 159/6.1 |
| 4,657,677 | A |   | 4/1987 | Roubickek et al. |   |
| 5,447,753 | A |   | 9/1995 | Noda et al. |   |
| 5,755,924 | A | * | 5/1998 | Feres | 159/6.3 |
| 5,972,171 | A | * | 10/1999 | Ross et al. | 203/40 |

(Continued)

FOREIGN PATENT DOCUMENTS

DE    2832071 A1    1/1980

(Continued)

OTHER PUBLICATIONS

Written Opinion of the Internation Searching Authority issued in PCT/FI2006/050486, 2007.

(Continued)

*Primary Examiner*—Duane Smith
*Assistant Examiner*—Thomas Bennett McKenzie
(74) *Attorney, Agent, or Firm*—Stiennon & Stiennon

(57) ABSTRACT

Coating material is fed into a vacuum container inside which are apparatus for separating gas from the coating material. The degassing apparatus (10) has two separate compartments (11, 12) so that degassing is carried out in two different stages by using a single apparatus.

19 Claims, 3 Drawing Sheets

U.S. PATENT DOCUMENTS

| | | | |
|---|---|---|---|
| 6,345,908 B1 * | 2/2002 | Gmeiner | 366/139 |
| 6,629,821 B1 * | 10/2003 | Yokota et al. | 417/199.1 |
| 6,630,013 B2 | 10/2003 | Myrttinen et al. | |
| 2003/0205142 A1 * | 11/2003 | Shah | 96/193 |
| 2006/0083969 A1 * | 4/2006 | Grasso | 429/26 |

FOREIGN PATENT DOCUMENTS

| | | |
|---|---|---|
| JP | 56100611 | 8/1981 |
| JP | 63-181404 A | 7/1988 |
| JP | 04-361696 | 12/1992 |
| JP | 09-103601 | 4/1997 |
| JP | 2001-009206 | 1/2001 |
| JP | 2004-186510 A | 7/2004 |
| JP | 2004-290859 A | 10/2004 |
| WO | 2006/128963 A2 | 12/2006 |
| WO | 2007/074211 A1 | 7/2007 |

OTHER PUBLICATIONS

Search Report issued in PCT/FI2006/050486, 2007.
Translation of an Office Action of Japan Patent Office for 2008-514134, 2010.
Written Opinion of the International Searching Authority issued in PCT/FI2006/050203, 2006.
Search Report issued in PCT/FI2006/050203, 2006.
Search Report issued in FI20055280, 2006.

* cited by examiner

METHOD AND APPARATUS FOR DEGASSING COATING MATERIAL

CROSS REFERENCES TO RELATED APPLICATIONS

This application is a U.S. national stage application of International App. No. PCT/FI2006/050486, filed Nov. 9, 2006, the disclosure of which is incorporated by reference herein, and claims priority on Finnish App. No. 20055704, filed Dec. 28, 2005.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a method and apparatus for degassing coating material. In the method, coating material is fed into a vacuum container inside which are means for separating gas from the coating material.

In the processing industry, the mixing of gases, such as air, with the liquids and compositions used in a process typically causes several problems. Especially when coating paper or a similar fibrous web material, gas and gas bubbles in the coating material result in roughness on the surface of the paper in coating, and even areas where there is no coating at all. This problem is greater with some coating materials than others, but the problem is emphasized particularly with those coating materials that accumulate more gas than others. For example, coating materials containing talc typically contain large amounts of gas due to the properties of talc.

The significance of the problem is further affected by the coating method used. For example, in curtain coating, the gas content of the coating may be at most 0-0.25% by volume. Otherwise the gas bound by the coating may result in uncoated areas in the material to be coated, such as paper or board.

In multilayer curtain coating, the significance of degassing is even greater. Thus, if there are, for example, three or four coating layers, the coating used to produce each layer must be degassed as carefully as possible.

For removing the gas mixed with or dissolved in coating material have been developed vacuum deaerators, a known embodiment of which is shown in FIG. 1. The apparatus comprises a rotating drum arranged inside a vacuum container, into which drum the coating material is led, whereupon the coating material rises up the inner wall of the drum by the effect of centrifugal force and is discharged from the drum as a thin film colliding with the wall of the vacuum container.

The problem with prior art vacuum deaerators is their insufficient deaeration capacity, especially with highly viscous substances. This is due to the fact that the small air bubbles contained in highly viscous coating materials are unable, even under an extremely high vacuum, that is, low absolute pressure, to grow large enough to be broken or to be distinguished due to their specific rising rate. Attempts have been made to eliminate this problem by increasing the vacuum, but as a result, the solvent used in the coating material, for example water, vaporizes extremely readily, whereupon the quality of the coating material deteriorates, for example, as a result of an increase in the solids content of the coating material following from the vaporization of the coating material solvent. Another method used involves increasing mixing times, but in that case the operational capacity of the deaerators remains too low, which means that a greater number of deaerators must be acquired. Furthermore, if the separation capacity of known deaerators is increased by increasing the size of the apparatuses, the apparatus size will become excessively large and manufacturing costs will increase markedly.

SUMMARY OF THE INVENTION

The aim of the method and apparatus according to the present invention is to provide an improved gas separation solution, by means of which the gas contained in coating material can be removed better than before.

To achieve this aim, the method relating to the invention is characterized in that inside a second container part is arranged a drum rotating around an essentially vertical axis, and that in the method, coating material is fed from the first container part to the bottom part region of the drum, whereupon the rotating motion of the drum causes the coating material to rise up the inner wall of the drum and to discharge from the top edge of the drum as a thin film against the inner wall of the second container part, wherefrom the coating material flows downwards to be led out of the apparatus by discharge means. The apparatus according to the invention, comprising: a first container part, to which are connected means for providing a vacuum therein, means for feeding coating material inside the first container part, means for degassing the coating material in the first container part, and means for discharging the coating material from the first container part; and a second container part, to which are connected means for providing a vacuum therein, means for feeding coating material inside the second container part, means for degassing the coating material in the second container part, and means for discharging the coating material from the second container part, wherein the coating material is arranged to be first fed into the first container part, where the first degassing stage takes place, and then from the first container part into the second container part, where the second degassing stage takes place, is for its part characterized in that inside the second container part is arranged a drum rotating around an essentially vertical axis, in the bottom part region of which is fed coating material from the first container part, whereupon the rotating motion of the drum causes the coating material to rise up the inner wall of the drum and to discharge from the top edge of the drum as a thin film against the inner wall of the container part, wherefrom the coating material flows downwards to be led out of the apparatus by discharge means.

In a preferred embodiment of the present invention, an absolute pressure of approximately 1 kPa-15 kPa is provided in the vacuum container parts. If a lower absolute pressure is provided in the chamber, this will mean, among other things, that the evaporating point of the solvent contained in the coating material will fall and there is a risk of the quality of the coating material deteriorating as a result of degassing.

On the other hand, if a higher absolute pressure is provided in the chamber, this will not necessarily suffice to increase the size of gas bubbles in the coating material by means of a vacuum. An absolute pressure of about 3 kPa-15 kPa in the vacuum container is highly preferable. By raising the lower limit of the absolute pressure used is ensured even better that the coating material will not be able to vaporize during degassing.

The greatest advantage of the method and apparatus according to the invention is its efficiency, whereby gas contained in coating material can be removed rapidly and thoroughly from a large amount of coating material.

The invention is described in greater detail in the following, with reference to the accompanying drawings.

DESCRIPTION OF THE PREFERRED EMBODIMENTS

Figure 1:
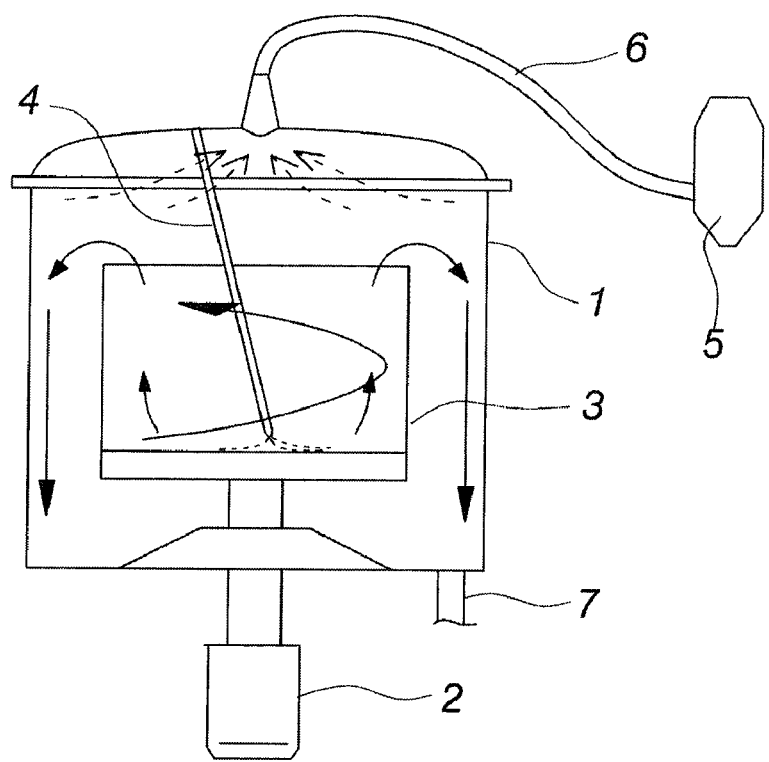
FIG. 1 shows diagrammatically a vacuum deaerator of the prior art.

FIG. 1 shows diagrammatically a vacuum-operated apparatus for removing gas, typically air, from coating material. As shown in the figure, the system comprises an impermeable vacuum container 1, inside which is arranged a drum 3 rotated by a motor 2. The gas-containing coating material is fed inside the drum via a pipe 4. The container is connected to a vacuum source 5 by means of a vacuum pipe 6. When the drum rotates, the coating material rises up the inner wall of the drum by the effect of centrifugal force and is centrifuged from the top edge of the drum tangentially as a thin film colliding with the wall of the vacuum container, along which it flows downwards, discharging through a discharge opening 7 in the bottom part of the container. An air bubble that has entered with the film breaks and the air released discharges through the vacuum pipe via a deaerator connected to the vacuum source.

Figure 2:
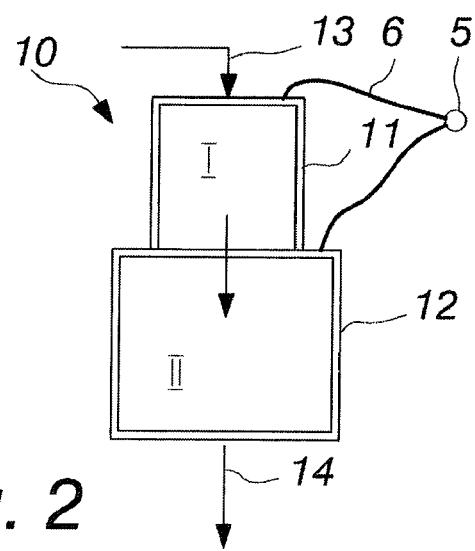
FIG. 2 shows a diagrammatic view in principle of the solution according to the invention.

FIG. 2 shows a diagrammatic view in principle of the apparatus according to the invention. The apparatus 10 comprises a first, upper container part 11, and a second, lower container part 12. The coating material to be subjected to degassing is supplied along a pipe 13 into the upper container part, where a first degassing stage is carried out, after which the coating material is fed into the lower container part, where a second degassing stage is carried out, following which the coating material is transferred from the apparatus to the place of use via discharge means 14. At the first stage, or preliminary degassing stage, is preferably removed the major part of the gas contained in the coating material and the remainder is removed at the latter stage. The solution increases the efficiency of degassing substantially, resulting in at least twice, preferably even three or four times the deaeration capacity of a single-stage solution at a relatively lower cost and smaller space requirement than when using, for example, two separate single-stage apparatuses.

Figure 3:
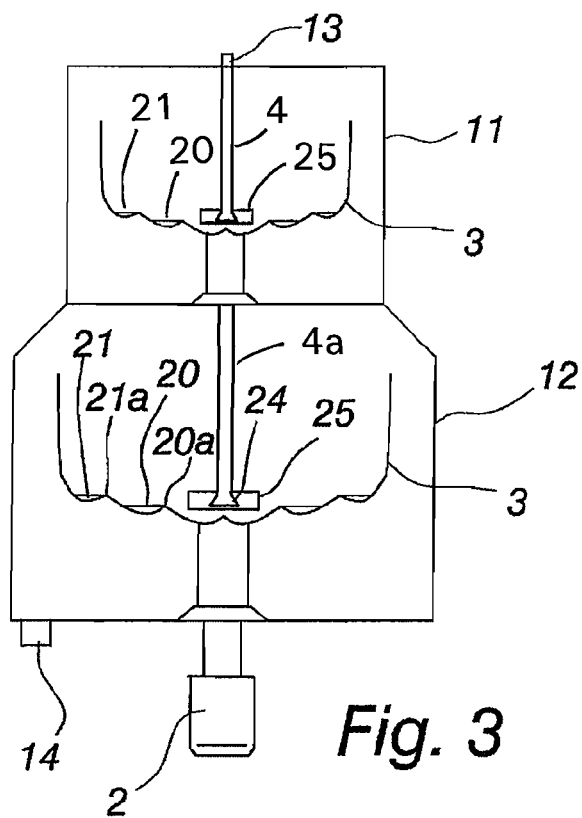
FIGS. 3 to 5 show diagrammatically some alternative embodiments of the apparatus according to the invention.

FIG. 3 shows an embodiment of the apparatus according to the invention. The apparatus comprises a rotating drum 3 arranged inside each container part 11, the said drums being driven by a motor 2. The inner surface of the drum is stepped, comprising, in the embodiment shown, two step levels 20, 21 so that the coating material rising upwards by the effect of the rotary motion will form a thin, veil-like film on each of the said step levels, respectively. When leaving the last level, the paste film is guided from the top edge of the drum to the inner wall of the container part 11 and along that further to the lower part of the container part, from where it is led to the lower container part 12. In the embodiment shown, there is a corresponding drum in the lower container part, which is also driven by a motor 2. The drum in both container parts 11, 12 corresponds to a solution disclosed in an earlier Finnish patent application FI 20055280, filed on Jun. 2, 2005, by the Applicant of the present application, by means of which is achieved an improved degassing capacity compared with the prior art solution.

In the upper part region of the lower container part 1 are preferably arranged means (not shown) for imaging the veil-like film produced, whereupon when the veil-like film remains intact, there are no air bubbles remaining in the paste. The image information produced by the imaging means may be used for controlling the operational parameters of the degassing apparatus.

The step levels may be made, for example, in accordance with FIG. 3 of successive concave-based sections, the front edge 20a, 21a of which determines the elevation of the step level, that is, the elevation of the thin, veil-like film produced. To achieve efficient degassing and for compact dimensioning of the apparatus, the difference in height between the successive step levels is preferably within the range from 20 mm to 150 mm, more preferably within the range from 40 mm to 100 mm. The radial distance between the step levels, that is, the width of the veil produced is preferably within the range from 20 mm to 200 mm, more preferably within the range from 40 mm to 120 mm. The thickness of the final veil-like film leaving the drum 3 is preferably arranged to be adjusted so as to be at most as thick as the coating layer desired.

The coating material feeding means 4, 4a preferably comprise a nozzle part 24, which is arranged in the vicinity of the central region of the bottom part of the drum, and around the nozzle part is arranged an annular protective part 25, which prevents the coating material from splashing sideways and the formation of thicker sections resulting therefrom in the coating material rising up the wall of the drum, which would lead to irregular degassing of the coating material and thus to faults in the coating formed on the fibrous web.

The solution according to the invention improves the degassing of paste and increases capacity. The solution also makes possible process-time monitoring and controlling of the operational parameters of the process on the basis of such monitoring. The operational parameters include speed of rotation of the drum 3, vacuum levels in container parts 11, 12, height of the fluid level at the bottom of the lower container part, which is affected by the feed rate of the paste fed into the drum, and the discharge rate of the degassed paste led out of the container part.

Multilevel veiling of the coating paste improves deaeration, which means that it is possible to use a higher lower limit for the absolute pressure level than in earlier solutions, thus avoiding the deterioration of paste quality, which might result from the possible evaporation of some of the components of the paste due to a too low pressure level.

Figure 4:
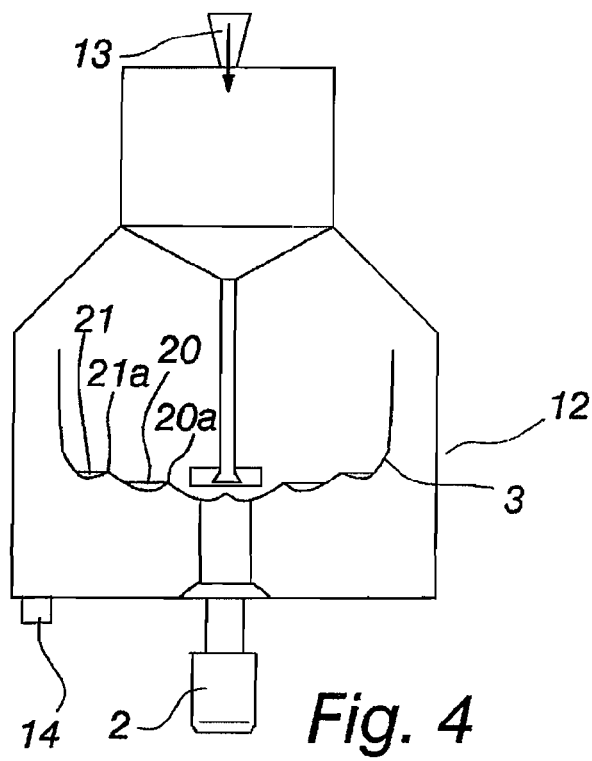

FIG. 4 shows another embodiment of the apparatus according to the invention, where the lower container part 12 corresponds to the lower container part of FIG. 3. The upper container part 11 is made into a cyclone, where preliminary degassing takes place.

Figure 5:
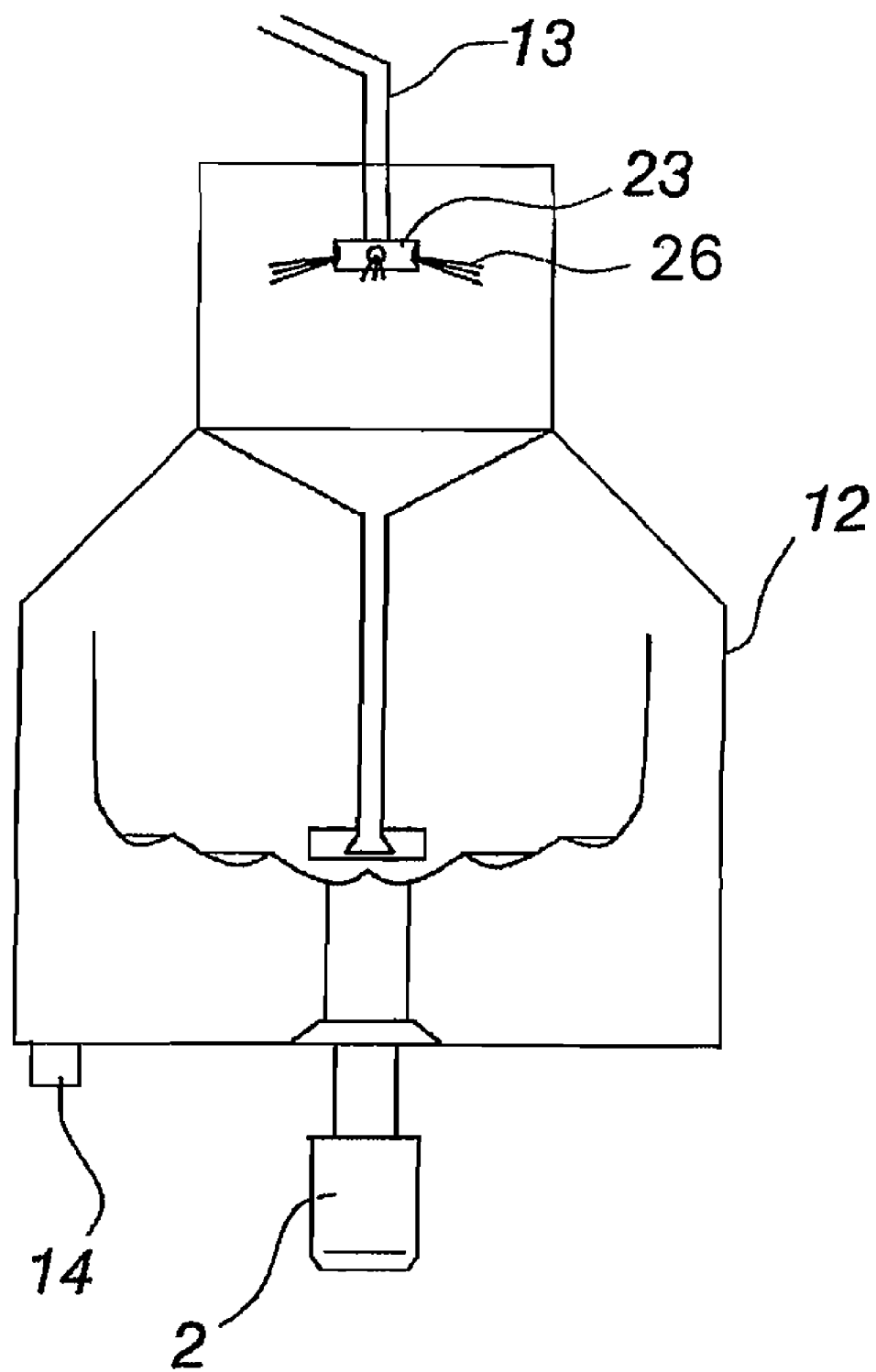

FIG. 5 shows yet another embodiment of the apparatus according to the invention, where the lower container part 12 corresponds to the lower container part of FIG. 3. The upper container part 11 is provided with spraying means 23, from which the coating material to be degassed flows out and forms into drops 26, from which gas separates relatively easily due to the effect of the vacuum.

The solution according to the invention may conceivably also be used for degassing other substances than coating material, such as for the deaeration of sludge.

The invention claimed is:

1. A method for degassing coating material comprising the steps of:
   supplying coating material to a first stage of a single degassing apparatus having the first stage in a first compartment and a second stage contained in a second compartment of the same single degassing apparatus;
   degassing the coating material in the first stage in the first compartment by forming a vacuum therein;
   forming a vacuum in the second compartment containing the second stage;
   feeding the degassed coating material from the first stage to a bottom part region of a drum rotating in the second compartment around an essentially vertical axis, the second compartment having an inner wall, the vertical axis defining a radial direction and a height direction, and wherein the drum has an inner wall;
   rotating the drum to cause the coating material to rise up the inner wall of the drum and to discharge from an upper edge of the drum as a thin film against the inner wall of the second compartment so that the coating material flows downwards along the second compartment inner wall; and
   conducting the coating material out of the second compartment.

2. The method of claim 1 wherein the step of degassing the coating material in the first stage in the first compartment comprises:
   feeding the coating material to a bottom part region of a drum rotating in the first compartment around an essentially vertical axis, the first compartment having an inner wall, the vertical axis defining a radial direction and a height direction, and wherein the drum has an inner wall;
   rotating the first stage drum to cause the coating material to rise up the inner wall of the drum and to discharge from an upper edge of the drum as a thin film against the inner wall of the first compartment so that the coating material flows downwards along the first compartment inner wall; and
   conducting the coating material out of the first compartment to the bottom part region of the drum rotating in the second compartment.

3. An apparatus for degassing coating material, comprising:
   a first container part, the first container part defining a first inside portion, the first inside portion connected to a first source of vacuum, so that coating material in the inside portion is degassed;
   a first coating material inlet arranged to feed coating material to the first inside portion of the first container part and a first coating material outlet arranged to discharge coating material from the first container part;
   a second container part mounted to the first container part, the second container part defining a second inside portion and an inner wall of the second inside portion, the second inside portion connected to a second source of vacuum, so that coating material in the second inside portion is degassed;
   a second coating material inlet connected to the first coating material outlet to supply coating material from the first inside portion to the second inside portion;
   a drum mounted for rotation around an essentially vertical axis in the second inside portion of the second container part, the drum having a bottom part region, a drum inner wall, and a drum upper edge, wherein the second coating material inlet is arranged in coating material supplying relation to the second container part drum bottom part region, and the drum inner wall is in coating material receiving relation to the drum bottom part region so when the drum is driven to rotate, coating material passes from the drum bottom part region to the drum inner wall, to the drum upper edge and then to the inner wall of the second inside portion; and
   a second coating material outlet arranged to discharge coating material flowing from the inner wall of the second inside portion.

4. The apparatus of claim 3 wherein the drum inner wall rises in a stepped manner forming at least two steps and at least two step levels, so that when the drum is driven to rotate, coating material passes from the drum bottom part region to the drum inner wall to the drum upper edge, so that the coating material will form a thin, veil-like film on each of the at least two different step levels.

5. The apparatus of claim 3 wherein the first source of vacuum and the second source of vacuum are at an absolute pressure of about 1 kPa to 15 kPa.

6. The apparatus of claim 5 wherein the first source of vacuum, and the second source of vacuum are at an absolute pressure of about 3 kPa to 15 kPa.

7. The apparatus of claim 3 further comprising:
   a nozzle part connected to the second coating material inlet, the nozzle part being arranged in the vicinity of a central region of the bottom part region of the drum; and
   an annular protective part positioned around the nozzle part and arranged to prevent the coating material from splashing sideways from the nozzle part.

8. The apparatus of claim 3 wherein a first part drum is arranged inside the first container part and mounted for rotating around an essentially vertical axis, the first part drum having an inner wall and a bottom part region arranged in coating material receiving relation to the first coating material inlet, such that rotating motion of the first part drum causes coating material to rise up the inner wall of the drum and to discharge from a top edge of the drum as a thin film against an inner wall of the first container part, such that the coating material flows downwards to the first coating material outlet.

9. The apparatus of claim 8 further comprising:
   a nozzle part connected to the first coating material inlet, the nozzle part being arranged in the vicinity of a central region of the bottom part region of first part drum ; and
   an annular protective part positioned around the nozzle part and arranged to prevent the coating material from splashing sideways from the nozzle part.

10. The apparatus of claim 8, wherein the first part drum inner wall rises in a stepped manner forming at least two steps and at least two step levels, so that when the first part drum is driven to rotate, coating material passes from the first part drum bottom part region to the drum inner wall to the drum upper edge, so that the coating material will form a thin, veil-like film on each of the at least two different step levels.

11. The apparatus of claim 3, wherein inside the first container part is arranged a cyclone to cause gas to be separated from the coating material.

12. The apparatus claim 3 wherein inside the first container part are arranged spraying parts arranged to feed coating material into the first container part in droplet form.

13. A method for degassing coating material comprising the steps of:
   supplying coating material to a first stage of a single degassing apparatus having the first stage in a first compartment and a second stage contained in a second compartment of the same single degassing apparatus;
   degassing the coating material in the first stage in the first compartment by forming a vacuum therein;

forming a vacuum in the second compartment containing the second stage;

feeding the degassed coating material from the first stage to a bottom part of a drum rotating in the second compartment around a drum axis which is essentially vertical, the second compartment having an inner wall, and wherein the drum axis defines a radial direction and a height direction, defined as extending vertically parallel to the vertical axis, wherein the drum has an inner wall with a plurality of steps, each step defining a level, which step levels ascend in the height direction as the steps progress outwardly in the radial direction;

using forces created by rotating motion of the drum to cause the coating material to rise up the inner wall of the drum and flow over at least two of the plurality of steps;

veiling the coating material over a front edge of each step to form a radially extending veil-like thin film of the coating material spaced from the inner wall of the drum, which extends between said front edge of the step to the inner wall of the drum;

causing the coating material to discharge from an upper edge of the drum as a thin film against the inner wall of the second compartment so that the coating material flows downwards along the second compartment inner wall; and conducting the coating material out of the second compartment.

14. An apparatus for degassing coating material, comprising:

a first container part, the first container part defining a first inside portion, the first inside portion connected to a first source of vacuum, so that coating material in the first inside portion is degassed;

a first coating material inlet arranged to feed coating material to the first inside portion of the first container part and a first coating material outlet arranged to discharge coating material from the first container part;

a second container part mounted to the first container part, the second container part defining a second inside portion and an inner wall of the second inside portion, the second inside portion connected to a second source of vacuum, so that coating material in the second inside portion is degassed;

a second coating material inlet connected to the first coating material outlet to supply coating material from the first inside portion to the second inside portion;

a drum mounted for rotation around a vertical axis in the second inside portion of the second container part, the vertical axis defining a radial direction and a height direction defined as extending vertically parallel to the vertical axis, the drum having a bottom part region, a drum inner wall, and a drum upper edge, wherein the second coating material inlet is arranged in coating material supplying relation to the second container part drum bottom part region, and the drum inner wall is in coating material receiving relation to the drum bottom part region so when the drum is driven to rotate, coating material passes from the drum bottom part region to the drum inner wall, to the drum upper edge and then to the inner wall of the second inside portion; and wherein the drum has an inner surface which has at least two steps, each step defining a level, which step levels ascend in the height direction as the steps progress outwardly in the radial direction, the steps formed of successive concave sections, defining front edges which determine an elevation of the step levels in the height direction, the front edges arranged such that the coating material rising upwards due to the effect of rotation of the drum will form a thin veil-like film of the coating material spaced from the inner wall of the drum, which extends between said front edges of the step levels to the inner wall of the drum; and an outlet mounted to the tank for discharging the coating material from the tank.

15. The apparatus of claim 14 wherein a first part drum is arranged inside the first container part and mounted for rotating around an essentially vertical axis, the first part drum having an inner wall and a bottom part region arranged in coating material receiving relation to the first coating material inlet, such that rotating motion of the first part drum causes coating material to rise up the inner wall of the drum and to discharge from a top edge of the drum as a thin film against an inner wall of the first container part, such that the coating material flows downwards to the first coating material outlet.

16. The apparatus of claim 15 wherein the first part drum inner wall rises in a stepped manner forming at least two steps and at least two step levels, so that when the drum is driven to rotate, coating material passes from the drum bottom part region to the drum inner wall to the drum upper edge, so that the coating material will form a thin, veil-like film on each of the at least two different step levels.

17. The apparatus of claim 14 wherein inside the first container part is arranged a cyclone to cause gas to be separated from the coating material.

18. The apparatus of claim 14 wherein inside the first container part are arranged spraying parts arranged to feed coating material into the first container part in droplet form.

19. The apparatus of claim 14 further comprising:

a nozzle part connected to the second coating material inlet, the nozzle part being arranged in the vicinity of a central region of the bottom part region of the drum; and an annular protective part positioned around the nozzle part and arranged to prevent the coating material from splashing sideways from the nozzle part.

* * * * *